United States Patent
Muppidi et al.

(10) Patent No.: US 9,444,820 B2
(45) Date of Patent: *Sep. 13, 2016

(54) PROVIDING CONTEXT-BASED VISIBILITY OF CLOUD RESOURCES IN A MULTI-TENANT ENVIRONMENT

(71) Applicant: International Business Machines Corporation, Armonk, NY (US)

(72) Inventors: Sridhar R. Muppidi, Austin, NC (US); William Alexander Bird, Fredericton (CA); Sreekanth Ramakrishna Iyer, Bangalore (IN); Archana Kumar, Bangalore (IN); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/503,091

(22) Filed: Sep. 30, 2014

(65) Prior Publication Data

US 2015/0200958 A1    Jul. 16, 2015

Related U.S. Application Data

(63) Continuation of application No. 14/156,547, filed on Jan. 16, 2014.

(51) Int. Cl.
*H04L 29/06* (2006.01)
*H04L 12/911* (2013.01)
*H04L 12/24* (2006.01)

(52) U.S. Cl.
CPC .............. *H04L 63/10* (2013.01); *H04L 41/28* (2013.01); *H04L 47/70* (2013.01); *H04L 63/1433* (2013.01); *H04L 63/1441* (2013.01); *H04L 63/20* (2013.01); *H04L 41/50* (2013.01)

(58) Field of Classification Search
CPC ........... H04L 41/0806; H04L 41/0233; H04L 41/5003; H04L 63/10; H04L 63/20; H04L 47/70; H04L 63/1433; H04L 63/1441; H04L 41/28; H04L 41/50; G06F 11/3495; G06F 11/1464; G06F 11/30; G06F 2209/50
USPC ........................................ 709/203, 224, 226
See application file for complete search history.

(56) References Cited

U.S. PATENT DOCUMENTS

| | | | | |
|---|---|---|---|---|
| 6,011,847 | A | * | 1/2000 | Follendore, III ............. 713/160 |
| 6,167,368 | A | * | 12/2000 | Wacholder ....................... 704/9 |
| 8,280,892 | B2 | * | 10/2012 | Marvit et al. ................. 707/749 |

(Continued)

*Primary Examiner* — Don Zhao
(74) *Attorney, Agent, or Firm* — Steven Chiu; David H. Judson

(57) ABSTRACT

A secure tag generation service is associated with a cloud infrastructure. This service establishes a security context for a particular cloud tenant based on a tenant's security requirements, one or more cloud resource attributes, and the like. The security content is encoded into a data structure, such as a tag that uniquely identifies that security context. The tag is then encrypted. The encrypted tag is then propagated to one or more cloud management services, such as a logging service. When one or more cloud resources are then used, such use is associated with the encrypted security context tag. In this manner, the encrypted tag is used to monitor activities that are required to meet the security context. When it comes time to perform a security or compliance management task, any cloud system logs that reference the encrypted security context tag are correlated to generate a report for the security context.

7 Claims, 6 Drawing Sheets

(56) References Cited

U.S. PATENT DOCUMENTS

| | | | |
|---|---|---|---|
| 8,825,472 B2* | 9/2014 | Raghuveer | 704/9 |
| 9,081,852 B2* | 7/2015 | Marvit et al. | |
| 2005/0138110 A1* | 6/2005 | Redlich et al. | 709/201 |
| 2008/0154873 A1* | 6/2008 | Redlich et al. | 707/5 |
| 2010/0010968 A1* | 1/2010 | Redlich et al. | 707/3 |
| 2010/0289627 A1* | 11/2010 | McAllister et al. | 340/10.42 |
| 2010/0303230 A1* | 12/2010 | Taveau et al. | 380/30 |
| 2011/0209193 A1* | 8/2011 | Kennedy | 726/1 |
| 2012/0005232 A1* | 1/2012 | Oleynik | 707/792 |
| 2012/0179646 A1* | 7/2012 | Hinton et al. | 707/607 |
| 2012/0290647 A1* | 11/2012 | Ellison et al. | 709/203 |
| 2013/0268357 A1* | 10/2013 | Heath | 705/14.53 |
| 2014/0229159 A1* | 8/2014 | Branton | 704/9 |
| 2014/0259056 A1* | 9/2014 | Grusd | 725/34 |
| 2014/0270482 A1* | 9/2014 | Chakraborty et al. | 382/154 |
| 2015/0142798 A1* | 5/2015 | Poupko et al. | 707/736 |

* cited by examiner

|   | A | B | C |
|---|---|---|---|
|   |   | ATTRIBUTE | SELECTED VALUE |
| 1 |   |   |   |
| 2 | TENANT DETAILS | ID | 111 |
| 3 |   | NAME |   |
| 4 |   | DEPARTMENT |   |
| 5 |   | LOCATION | US |
| 6 | DURATION | FROM DATE | 4/21/2012 |
| 7 |   | TO DATE | 4/24/2012 |
| 8 | WORKLOAD DEFINITION | APPLICATION | ABC |
| 9 |   | DATABASE | PQR |
| 10 |   | MESSAGE QUEUE |   |
| 11 |   | CACHE |   |
| 12 | INFRASTRUCTURE | VIRTUAL SERVER | VM1 |
| 13 |   | NETWORK | VLAN#2 |
| 14 |   | STORAGE | ST3 |
| 15 | COMPLIANCE | HIPAA | HIPAA |
| 16 |   | PCI |   |
| 17 |   | COBIT |   |
| 18 |   | SOX |   |
| 19 | TECHNICAL ENVIRONMENT | DEVELOPMENT | PRODUCTION |
| 20 |   | TEST |   |
| 21 |   | PRODUCTION |   |
| 22 |   |   |   |
| 23 |   | ENCRYPTED SECURITY CONTEXT TAG | ASD!@#$% |

FIG. 6

PROVIDING CONTEXT-BASED VISIBILITY OF CLOUD RESOURCES IN A MULTI-TENANT ENVIRONMENT

BACKGROUND OF THE INVENTION

1. Technical Field

This disclosure relates generally to cloud-based environments and, in particular, to techniques to produce context-specific data for various purposes, such as cloud resource monitoring, data logging, compliance analysis, reporting, problem determination, and forensics, among others.

2. Background of the Related Art

Businesses often have to provide information to show compliance with different external regulations including government and industry regulations and, in addition, to demonstrate compliance with internal policies and procedures. These external regulations include, for example, the Sarbanes-Oxley (SOX) Act, the Health Insurance Portability and Accountability Act (HIPAA), and the like. Often times, compliance with these and other regulations may be shown using information contained in audit logs maintained by information technology (IT) organizations. For compliance reasons, these audit logs often are maintained for years. Audit logs are useful for checking the enforcement and effectiveness of information technology controls, accountability, and vulnerability, and/or risk analysis. An information technology organization also may use auditing of security related critical activities to aid in forensic investigations, such as security incidents that may occur. When a security incident occurs, an audit log enables an analysis of the history of activities that occurred prior to the security incident occurring. These activities include, who did what, when, where, and how. With the analysis of an audit log, appropriate corrective actions may be taken. Audit logs are typically made available in relational databases to allow easy querying of the information by reporting programs or software to generate operational and trend reports.

While compliance may be seen to ensure the ability to ensure that a security policy is enforced, compliance may also be applied to other types of policy, such as service level agreements (e.g., using timestamps on audit logs to ensure that an overall Service Level Agreement (SLA) is satisfied), legislative compliance (e.g., on control or release of privacy-related information), or even policy management itself (e.g., who changed a policy, when and how, and was it in compliance with the policy for compliance-policy-management). Further, compliance with a particular policy, or a detailed forensics examination of actions within a system, may require more than just "audit" logs. It may also require access to error and trace logs, typically used within the scope of a problem determination examination.

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP.

Emerging cloud environments are being created out of existing IT infrastructures that are being adapted to support cloud-based services. One key characteristic of cloud computing that is different from existing environments is the requirement for so-called "multi-tenant" support, sometimes referred to as multi-customer single deployment. To satisfy this requirement, service providers have to be able to isolate different customer usage of the cloud services. In particular, customers have compliance guidelines that they follow, and need to follow, when using cloud services. These customers look to service providers to support their compliance requirements, and they desire to obtain data from the service providers to use for compliance analysis. The service providers need to supply that data, but at the same time maintain isolation between and among their specific customers that are sharing cloud resources. Generally, IT infrastructures do not allow for separating out compliance data contained in log files and audit records.

A specific problem is that cloud service providers do not have an efficient and secure mechanism by which they can obtain visibility into the cloud resources they are managing on behalf of their tenants. Secure visibility and transparency into the cloud provider's infrastructure and security controls, which can be elusive, are essential in achieving the problem of ensuring cloud computing compliance. Indeed, the problem of ensuring compliance becomes cumbersome when the resources are virtualized and spread across multiple locations and are shared by multiple projects and tenants. Also, the problem is exacerbated when cloud consumers request compliance reports (e.g., for meeting their audit requirements) in multiple contexts. As a consequence, visibility needs to be provided at various contexts, e.g., an identity context (who did what), a resource ownership context (who owns what resource), and an environment/workload context (what applications or infrastructure were used), and so forth. Indeed, often a particularly complex compliance requirement calls for visibility across many such contexts.

BRIEF SUMMARY

This disclosure addresses these deficiencies by providing a context-specific "view" of a particular tenant within the multi-tenant computing infrastructure. To this end, a "security context" is first established for a particular tenant based, for example, on the tenant's identity and security requirements, as well as the attributes of the various cloud resources that the tenant will use or is using in the cloud infrastructure. The data from which the security context is built is provided in the form of "tags" (sometimes referred to as machine tags) that are otherwise used in cloud environments for basic classification and identification. In one embodiment, the tags (representing the tenant's security requirements and the attributes of the cloud resources) are provided to a cloud service that provides a secure tag generation function. The secure tag generation function receives the tags from the various sources and generates the security context for the tenant. Typically, a tenant's security context differs from that of any other tenant, as it is expected that each tenant's particular security requirements will be distinct. Each tenant's security context is then encoded (or, more generally, encapsulated) into a data structure, preferably a tag that uniquely identifies that security context. The security context tag itself is then protected, e.g., by being encrypted, to generate an encrypted security context tag. The encrypted security context tag, which represents a particular tenant's security context, is then propagated to one or more cloud management services, such as a monitoring service, a logging service, an audit service, or the like. The encrypted security context tag may be static, or dynamic based on runtime behavior events occurring as the tenant interacts within the cloud infrastructure. Cloud activities (e.g., resource use) are then associated with the encrypted security context tag.

Any cloud service automation (e.g., configuration, monitoring or reporting tools) that operate with respect to the cloud resources query the encrypted security context tag as needed. Thus, for example, the encrypted security context tag is used to monitor one or more (or all) activities that are required to meet the security context. Then, when it comes time to perform a security or compliance management task (such as generating a report), any cloud system logs that have a reference to the encrypted security context tag are correlated to generate a report for the security context. In this manner, tenants or the cloud service provider can obtain security context-based visibility of a tenant's use of cloud resources.

The foregoing has outlined some of the more pertinent features of the disclosed subject matter. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 is a representative user interface exposed by the secure tag generation service to enable a user to input meta-data used to generate the security context and the associated encrypted security context tag.

DETAILED DESCRIPTION OF AN ILLUSTRATIVE EMBODIMENT

Figure 1:
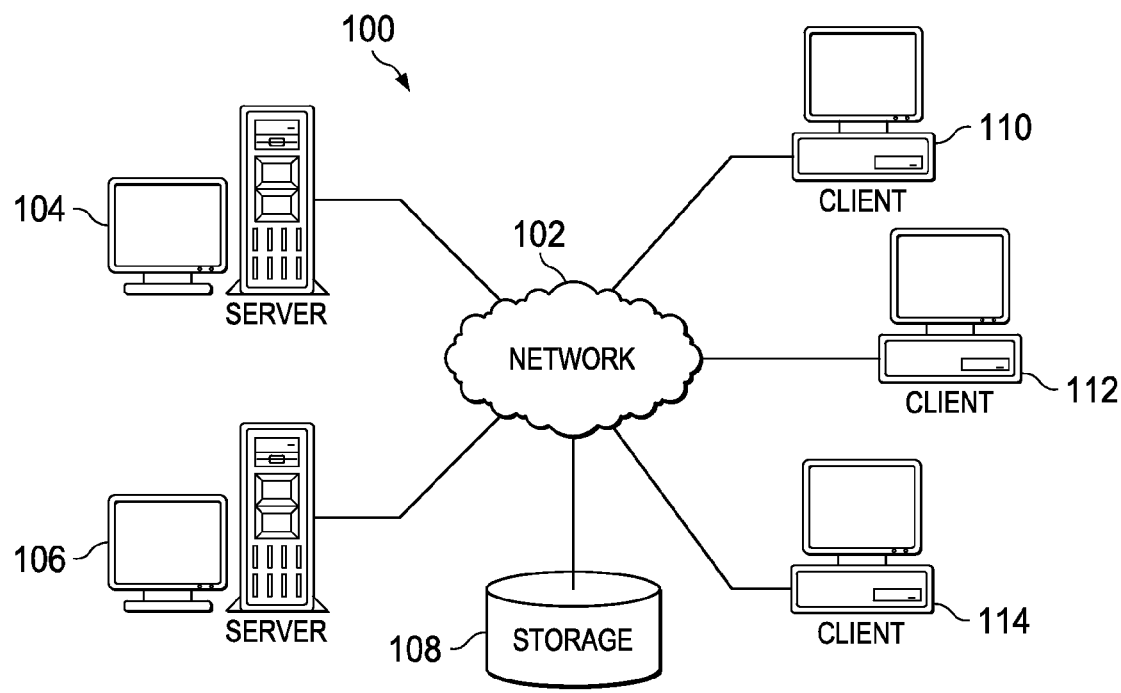
FIG. 1 depicts an exemplary block diagram of a distributed data processing environment in which exemplary aspects of the illustrative embodiments may be implemented.
Figure 2:
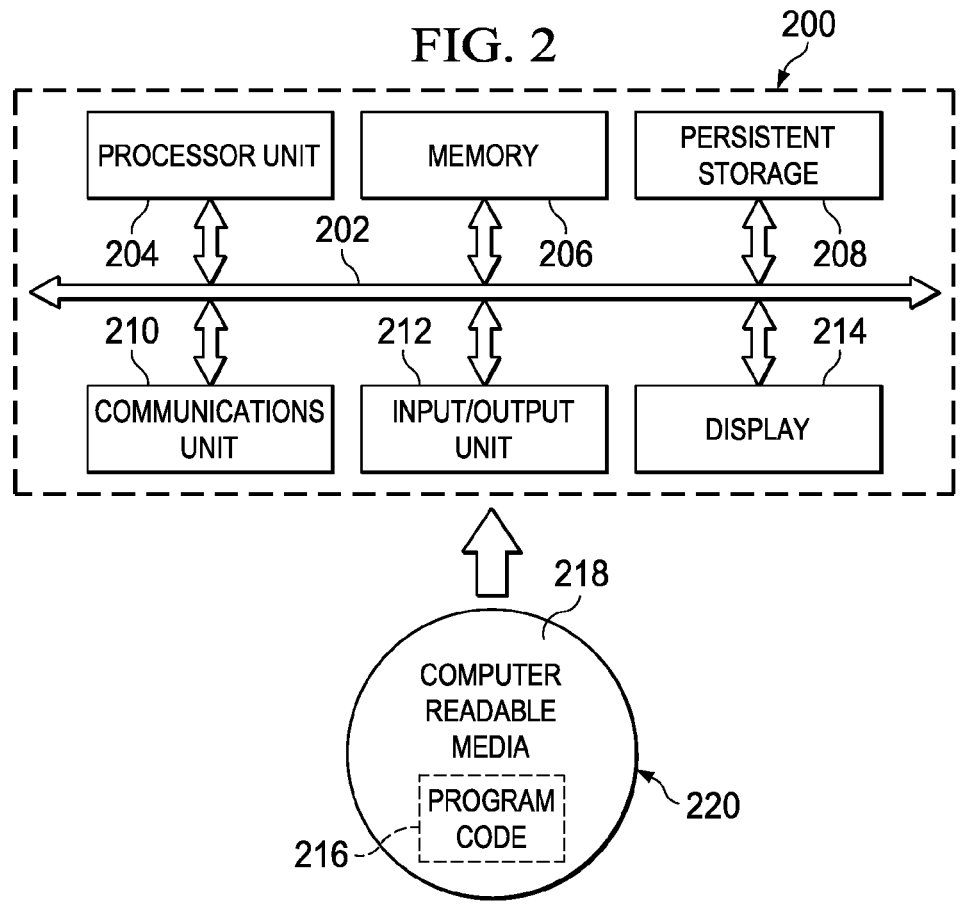
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Network Model With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
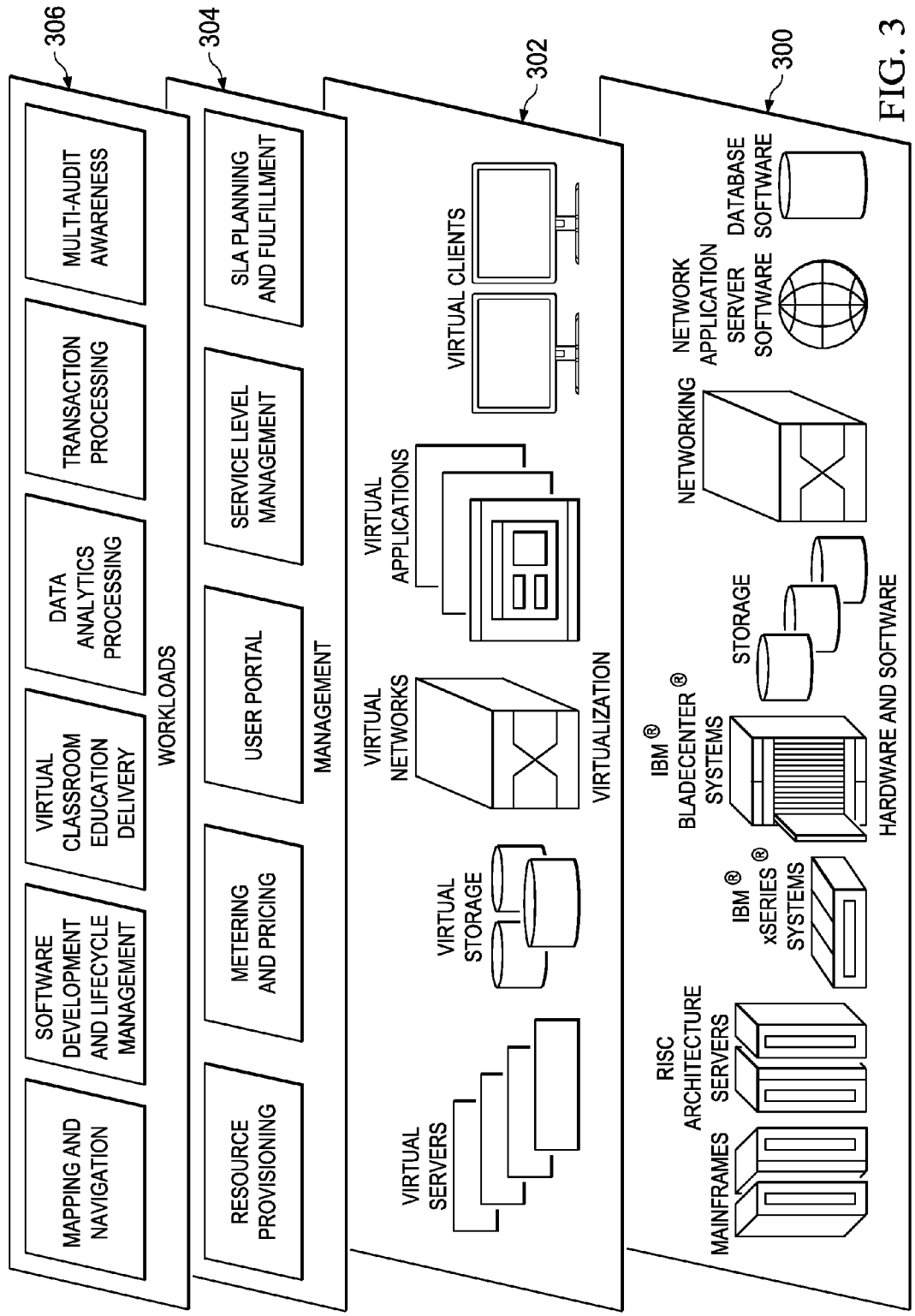
FIG. 3 depicts abstraction model layers of a cloud compute environment according to an embodiment of the invention.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to the teachings of this disclosure as will be described, multi-tenant audit awareness using tags that represent tenant security context(s).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli® Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

Auditing

Figure 4:
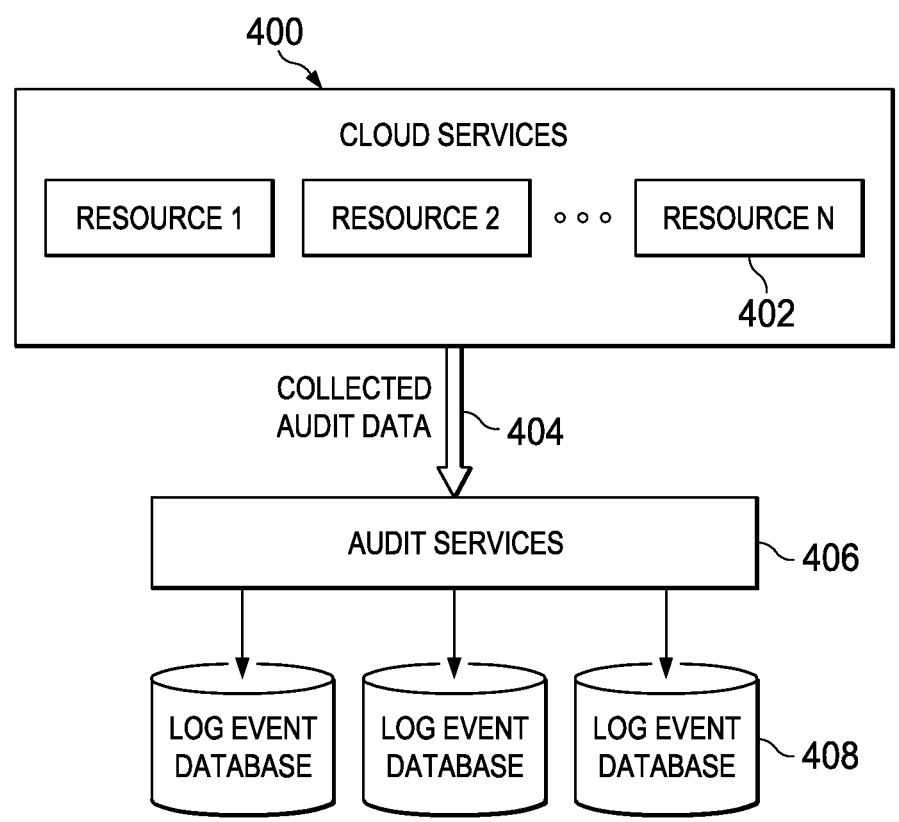
FIG. 4 depicts an existing approach wherein log data is retrieved from audited resources and put into a database for compliance analysis.

FIG. 4 illustrates how log data is retrieved from audited resources that are used to provide cloud services. In this example, the cloud services 400 expose a set of resources 402 (e.g., resources 1-n) hosted in a shared pool of configurable computing resources. Given the cloud paradigm described above, the "resource" should be broadly construed to cover any system, machine, process, program, application, utility, object or data associated therewith. Typically, collected audit data 404 is provided to an audit service 406, which normalizes that data and puts into log event databases 408 to allow for analyzing the data and creating reports that can be used for compliance. Audit service 406 typically comprises a distributed set of machines, programs and associated data structures that collectively provide the service, all in a known manner. As used herein, an audited resource within the cloud services environment is sometimes referred to herein as an operational management product (OMP). In this context, an OMP typically is deployed in a single customer environment and, as such, its associated log data does not include any information that can serve to distinguish that data from similar data generated by other such sources. In this respect, the OMP is said to be "multi-tenant unaware." As a consequence, the audit service (such as shown in FIG. 3) is not set up to support the inclusion with the logged data of a "customer identity." Thus, multi-tenant support for auditing is not available.

Tagging

A tag (sometimes referred to as a machine tag) is a way of attaching useful meta-data to a resource or other cloud-based object. Typically, a tag has a defined syntax that may vary depending on the implementation. Thus, for example, one known type of tag acts as an additional label or identifier for a resource, and it may be defined by a namespace, a predicate, and a value. A namespace defines a type, a predicate defines an attribute within the namespace, and the value is the value associated to the attribute. Tagging provides a way to add flexibility to the resource meta-data (e.g., by associating different values to the namespaces, predicates and associated values). Tags may be applied manually (through a configuration tool), via an automated set of tag rules (rule-based tagging), statically or dynamically, or programmatically. Known tagging solutions have been used to facilitate asset management (for basic classification and identification), and such techniques have enabled components to be tagged as part of a single workload.

Providing Context-based Visibility of Cloud Resources in a Multi-tenant Environment With the above as background, the techniques of this disclosure can now be described. As will be seen, this disclosure provides for a secure tag generation service to generate unique security context-specific tags that are then injected into existing cloud monitoring and logging systems. Once logs are populated with these enhanced tags, cloud consumers (e.g., tenants, and other permitted entities) can be provided much more fine-grained audit and compliance reports that, for the first time, are context-specific. The tags are thus leveraged to enhance compliance and security intelligence. In this approach, a security context tag is used to represent a security context, which is then used for monitoring and reporting of activities on one or more cloud resources for security and compliance. Preferably, a security context tag is encrypted for additional security.

Figure 5:
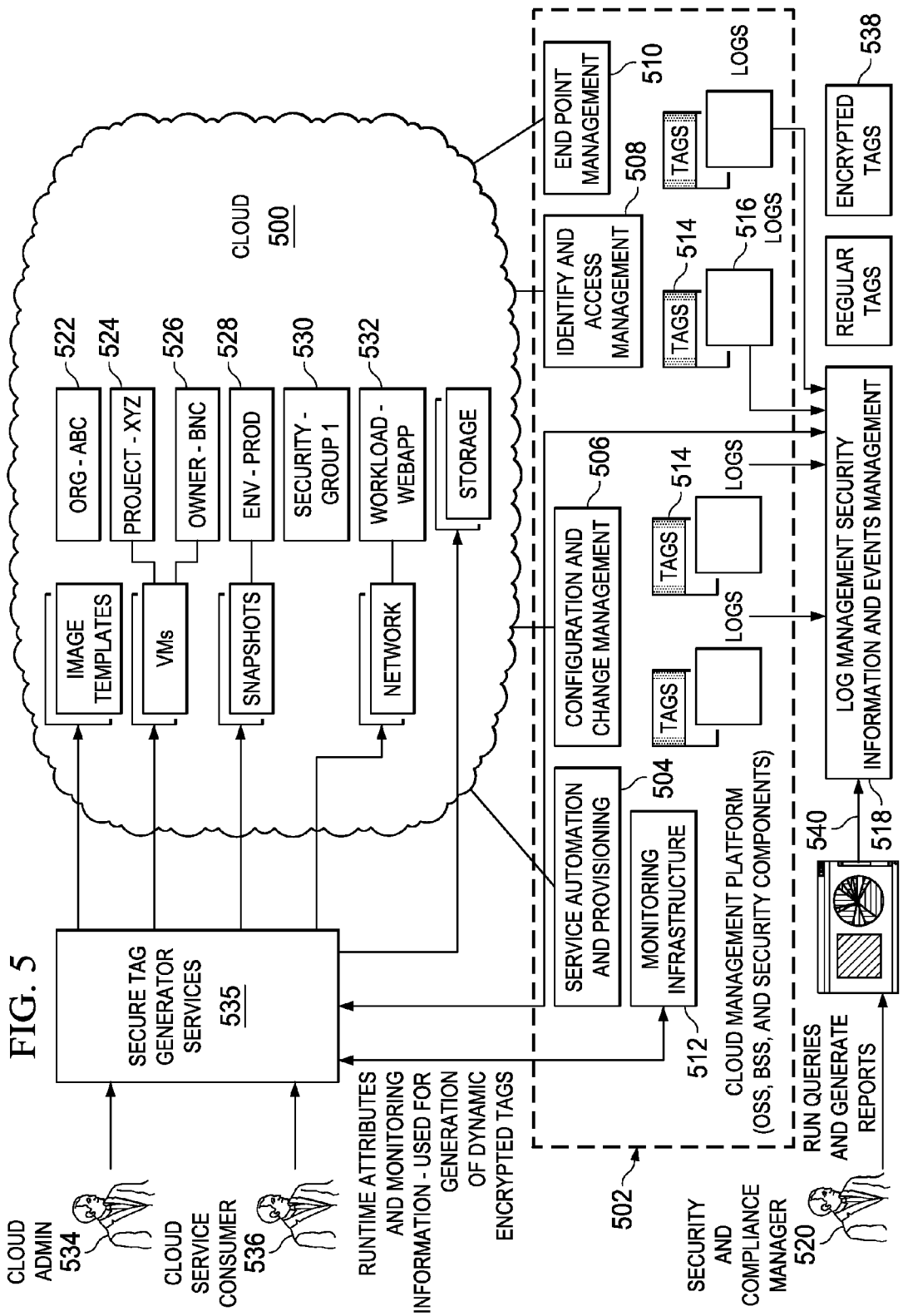
FIG. 5 depicts a cloud platform that is augmented to include a secure tag generation service according to this disclosure.

As illustrated in FIG. 5, and according to this disclosure, a cloud management platform 500 has associated therewith a conventional cloud management platform 502 having various OSS, BSS and security components as described above, namely, service automation and provisioning component 504, configuration and change management component 506, identity and access management component 508, endpoint management component 510, and monitoring infrastructure 512. Each of the cloud management components may export data to other systems and components in the form of machine tags 514, which tags then populate associated logs 516 for each of the components. These logs are provided to a log management security information and events management component 518, which aggregates the log information and exposes it for review by a security and compliance manager 520, typically using web-based access tools. In the cloud platform, the various cloud resources (e.g., network, virtual machines, storage, image templates, etc.) are used by a tenant, shown as Organization ABC 522. In this example, tenant 522 is using the cloud resources for a project 524 whose project owner 526 has configured (or has had configured by the service provider) a production environment 528 having a security group 530 and an associated workload 532. Of course, although just one tenant 522 is shown, the cloud platform 500 is also being shared by many other tenants, each of whom uses the cloud resources for their own specific purposes. As such, each tenant typically will configure, access and use a different set of cloud resources from those of any other tenant.

According to this disclosure, the cloud platform also includes a secure tag generator service 535. The secure tag generator service 535 is administered by a cloud service provider administrator 534, and a cloud service tenant (also known as a "customer," "consumer" or "user") 536 may also interact with the service 535. As illustrated, the secure tag generator service 535 receives runtime attributes and monitoring information from the monitoring infrastructure 512, and it uses such information, together with information about the tenant's security requirements (typically provided by the cloud service customer or the cloud administrator) to generate the "security context" for the tenant. As explained above, each tenant's security context is then encoded (or other encapsulated) into a security context tag, which is then encrypted by the service 535 to generate the encrypted security context tag 538. This set of encrypted security context tags 538 (e.g., one per current tenant) are then used by components of the cloud management platform 502 to generate logs 516, and events (as represented in tags 514). The logs are collected and managed by Security Information and Event Management component 518, where they are used to facilitate the tenant-specific, security context-based view(s) 540. Typically, the component 518 exports a user interface that is accessible by the tenant's security and compliance manager 520.

By generating the encrypted security context tags and exporting them to other cloud service automation (e.g., the automation and provisioning management component 504), the secure tag generator service 535 facilitates the generation of one or more tenant-specific compliance views (e.g., reports) to enable tenants (or the cloud service provider) to meet audit requirements in multiple contexts. In particular, by populating logs with encrypted security context tags, the cloud management systems are enabled to provide visibility across varied contexts, e.g., an identity context, a resource ownership context, an environment/workload context, and many others. The log data that has been enhanced to include encrypted security context tags may be stored, accessed or retrieved in any known manner.

The secure tag generator service 535 may be a standalone service, or it may be an adjunct to some other management service in the platform. Generalizing, the service is provided using a set of one or more computing-related entities (systems, machines, processes, programs, libraries, functions, or the like) that together facilitate or provide the functionality. In a typical implementation, a representative machine on which the software executes comprises commodity hardware, an operating system, an application runtime environment, and a set of applications or processes and associated data, that provide the functionality of a given system or subsystem. The service functionality may be implemented in a standalone machine, or across a distributed set of machines.

The following describes an approach used by the secure tag generation service to build the security context and the associated security context tag. Preferably, the secure tag generation service relies upon classification of the cloud resources and the associated meta-data describing those resources. As described above, it is known to provide machine tags in the cloud environment for basic classification and identification, and sometimes to take input from a user for this identification or to facilitate communication between resources that might be tagged with the same meta-data. According to this disclosure, the machine tags are provided to the secure tag generation service and used to define a tenant's security context for security monitoring and compliance. Typically, and as explained above, each tenant will have its own security context, which context may be static (unchanging over a given time period or during a cloud session), or dynamic (based, for example, on user behavior, events or occurrences within the cloud environment or externally), or some combination thereof. Tags may cover any and all aspects required from a compliance and visibility perspective.

Typically, different types of cloud resources such as the following are specified and assumed to have tags associated therewith: virtual servers, templates, storage, network, workloads (applications or topology), and the like. Preferably, tags are used to cover all of the aspects required from the applicable compliance and visibility perspective, which may vary. Preferably, the system also exposes a configuration tool interface (e.g., a set of network-accessible web pages) through which the user (e.g., a cloud services administrator, a cloud service consumer, or the like) may define a context for security monitoring and compliance. FIG. 6 illustrates a representative user interface for this purpose. In this example, which is merely representative, column A (602) represents the various types of cloud resources that may be used to define the security context. Each of the cloud resources has one or more attributes that are identified in column B (604). Column C (606) identifies a particular value for the resource or user-specified attribute, and those values may be user-supplied, system-supplied, or some combination thereof. These values, collectively, or in some defined aggregate, are then normalized and encoded to define a security context tag (or tag value) 608. In effect, the set of cloud resource attributes and user-specified attributes are processed to generate an encrypted security context tag. The particular manner in which the values are processed to generate the tag may be quite varied. One approach is to normalize the data values, concatenate them together, and then apply a cryptographic function to the result to generate the encrypted security context tag. Other approaches include, without limitation, normalizing the values, and applying one or more mathematical operations to the resulting normalized values, and then applying a hash or other function to the result. Any known normalization and computational approach may be used, with the preferred result being a unique encrypted security context tag that is uniquely associated with security context but that is not easily re-created and that does not expose details of the security context.

While a preferred approach is to provide a configuration tool (e.g., a web-based interface) to enable a user (such as the cloud administrator, a cloud service customer, the security and compliance manager, or some other person or entity) to define a particular context for security monitoring and compliance, this data may be provided to the secure tag generator automatically, programmatically or otherwise.

FIG. 6 illustrates the user interface, which (for purposes of explanation only) is shown as a spreadsheet. As illustrated in FIG. 6, there may be a plurality of sources used to generate the security context. Generally, these sources include the tenant's security requirements, the tenant's identity, and a set of one or more cloud resource attributes. Some of the information may be input by the user, and some of the information may be provided automatically or programmatically. As described above, the first column 602 identifies a type, the second column 604 one or more attributes associated with the type, and the third column 606 a selected value for the identified attribute. As a non-limiting example, the tags include: tenant details (e.g., name, identifier, department, location, and the like), duration (e.g., from date, to date, and the like), workload definition (e.g., application, database, message queue, cache, and the like), infrastructure (e.g., virtual server, network, storage, and the like), compliance requirements (e.g., HIPAA, PCI, COBIT, SOX, and the like), technical environment data (e.g., development, test, production, and the like), and others. Given this information, the secure tag generation service generates the encrypted security context tag.

The particular manner in which the encrypted security context tag is generated may be varied. In one non-limiting approach, the values in column 606 are normalized into a common format, and the result data values are then concatenated into a data string that is the security context tag. A cryptographic function (e.g., an MD5 hash, a SHA-1 hash, or the like) is then applied to the data string to generate the encrypted security context tag 608. The protection of the data string may be carried out using other encoding or cryptographic techniques, such as checksums, CRCs, encryption (with private or public keys), digital signatures, or the like. Also, there may be many different computational approaches used to generate the security context tag from the various sources of meta-data. Other approaches include, without limitation, normalizing the values, and applying one or more mathematical operations or more complex functions to the resulting normalized values, and then applying a hash or other function to the result. Any known normalization and computational approach may be used, with the preferred result being a unique encrypted security context tag that is uniquely associated with security context but that is not easily re-created and that does not expose details of the security context.

Of course, the logging or other cloud resource automation that uses the encrypted security context tags must have (or have access to) appropriate decrypting or other mechanisms to remove the security layer provided and to recover the data string representing the security context. The particular "unwrapping" mechanism will depend on the nature of the protection applied to the data string. A typical approach is to have the secure tag generator encrypt the data string with a private key having an associated public key to thereby generate the encrypted security context tag, and then providing the cloud resource automation (e.g., a logging component) with the public key when it is desired to recover the data string from the log file entry that includes the encrypted tag. A key management protocol (such as KMIP) may be used for the key management (access and retrieval). In this manner, preferably unique and distinct tags are generated by the tag generation service for each tenant (or for individual sub-tenants), and the particular security context generated provides a convenient way to encapsulate (preferably in a single, secure value) all of the resources required to be monitored for security and compliance; these tags are then exposed to and consumed by any other cloud service automation that requires or reports on information that is context-specific.

In particular, and as shown in FIG. 5, any cloud service automation or configuration tools that work on the cloud resources can then query the encrypted tags for a resource. In a typical use case, the tools use the encrypted tags in system or application logs. The logs are then configured to be forwarded to a central log management component. Based on the unique encrypted tags in the log, a correlation engine then generates custom reports for the defined security context encoded by the encrypted security context tag.

Thus, according to the basic technique of this disclosure, a security context is established or ascertained, e.g., based on a tenant's security requirements, one or more cloud resource attributes, and the like. The security content is encoded (or, more generally, encapsulated) into a data structure, such as a tag that uniquely identifies that security context. The tag preferably is then secured (e.g., by being encrypted). A secure tag generator service is used to obtain the data representing the security context and generating the encrypted security context tag. That tag is then propagated to one or more cloud management services, such as a logging service. When one or more cloud resources are then used, such use is associated with the encrypted security context tag. In this manner, the encrypted tag is used to monitor one or more (or all) activities that are required to meet the security context. Then, when it comes time to perform a security or compliance management task (such as generating a report), the cloud system logs that each have a reference to the encrypted security context tag are correlated to generate a report for the security context.

The approach herein leverages cloud resource metadata and user-provided metadata to create a unique security context for security and compliance monitoring/reporting for cloud resources. Preferably, this functionality is implemented as a "service" using a secure tag generator that generates unique encrypted tags leveraging the cloud resource meta-data and user-specified inputs. In an alternative embodiment, the secure tag generation is carried out by some other cloud management platform component, or it may be carried out externally to the platform itself in whole or in part.

The tag generated by the secure tag generation service is used for logging user activity, cloud resource usage, network monitoring, workload execution monitoring, and the like.

In an alternate embodiment, and as described above, an encrypted tag is "dynamic" in that its value may value, e.g., based on runtime behavior and events, external events, changing conditions or circumstances, or the like. For example, if a virtual machine executing in the cloud environment begins communicating with an IP address associated with a botnet, the system may be configured to generate a new security context. Upon this occurrence, a new encrypted tag (a dynamic encrypted tag) is then generated to be used to log further events associated with the resource. Thus, the system preferably uses static, and optionally dynamic (behavior), data to generate security context and encrypted tags that represent that context. In this manner, the system may provide automatic escalation of a security context and thereby (using the dynamic tag generated) enable additional logging and activity monitoring relating to that updated/modified context.

Figure 7:
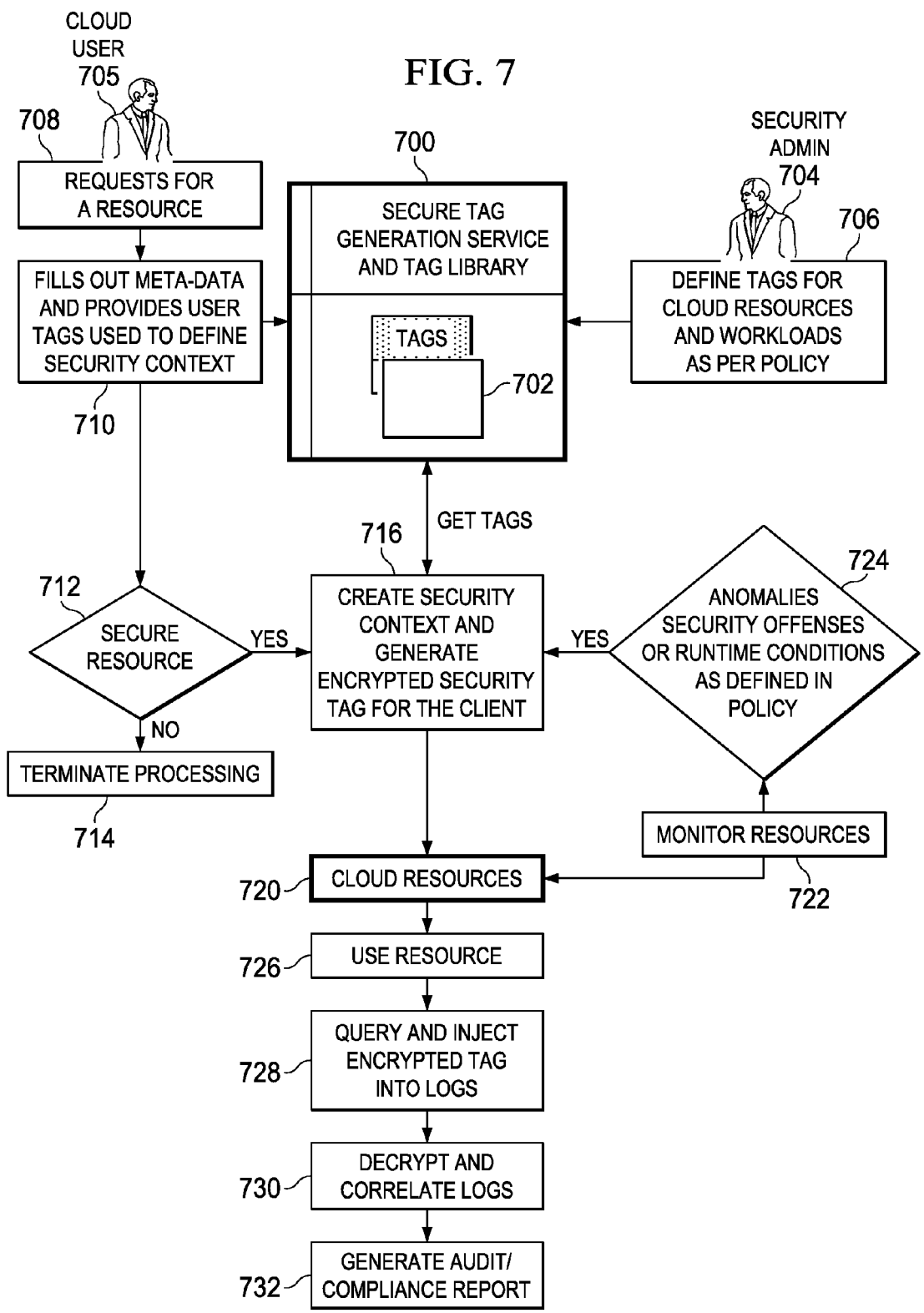
FIG. 7 is a process flow illustrating a technique to provide context-based visibility of cloud resources according to this disclosure.

FIG. 7 illustrates a process flow for the technique of providing context-based visibility of cloud resources according to this disclosure. The process uses the secure tag generation service 700 as has been described, which service stores a set of tags (or tag library) 702. Some of the tags may be pre-existing, and some of the tags may be defined dynamically or on-the-fly. Thus, typically the tag library will include tags that have been defined by a security administrator 704, who at step 706 defines one or more tags for the cloud resources and workloads, perhaps per a security policy. The defined tags are then stored in the tag library. Now, assume that a cloud user 705 is making a request for a secure resource, and that (for security and/or compliance purposes) it is desired to associate this resource request with a defined security context. This operation is also illustrated. In particular, at step 708, the user requests the resource. At step 710, the user and/or the system provides meta-data (e.g., tenant details, duration, etc.) that may be used to help define the security context. This meta-data also may be provided to the secure tag generation service 700. Also, step 710 may occur in whole or in part in an automated or programmatic manner, as well as manually depending on the type of meta-data. Step 710 may also occur in whole or in part in an off-line manner. At step 712, a test is performed to determine if the resource is a secure resource. If not, processing may be terminated at step 714 because, in this example scenario, the system does not need to monitor and track any security context.

If, however, the resource is a secure resource, processing continues at step 716 with the secure tag generator service 700 creating a security context (based at least on all or some portion of the meta-data received at step 710, the security administrator-supplied/defined tags at step 706, and perhaps from one or more other sources. At step 716, the resulting security context tag also is encrypted to generate the encrypted security context tag for the particular security context. In performing step 716, the secure tag generator service 700 may be queried so that existing tags stored in the service can be used to create the tag at issue (the current security context for this particular tenant). As noted above, preferably the determined security context is then encrypted to form an encrypted tag, which is useful thereafter to represent the security context when monitoring and reporting of a consumer's activities for security and compliance purposes. The encrypted security context tags are then exported throughout the cloud and can then be consumed by any cloud resource automation.

FIG. 7 also illustrates a representative example of how the encrypted tag is used to provide security context-specific visibility into the cloud resources being used. Step 720 represents the use of the one or more cloud resources (e.g., infrastructure, applications, virtual servers, storage, etc.) following creation and export of the tags. These resources are monitored at step 722 in the usual manner, e.g., using existing cloud-based monitoring tools and systems. Using the data output from the monitoring step, a test may be performed at step 724 to determine if the data represents any anomalies, security offenses or other runtime conditions defined in a security policy. If the outcome of the test at step 724 is positive, the information about such anomalies, security offenses or other runtime conditions may then be feed back into the secure tag generation service, possibly to re-define the security context to reflect those conditions. This is an example of the generation of a dynamic encrypted tag based on runtime behavior and events.

At step 726, the resource originally requested is used. As a result of such use, the encrypted tag generated by the secure tag generation service is then queried and injected into the log file for the resource. This is step 728. At step 730, the logs are decrypted (to remove the encryption and expose the security context tag (in the clear), with the resulting security context tag then correlated. At step 732, and using the information obtained from the security context tag, an audit or compliance report is generated. In this manner, an automated context-based visibility is provided.

The techniques described herein provide numerous advantages. By leveraging the secure tags and propagating them into system logs and the like, the disclosed subject matter provides a secure and efficient way to ensure that the service provider can provide more accurate security and compliance reports, including reports that take into consideration a cloud consumer's actual security context. The approach enables the tenant's security context to be dynamic, thereby enabling the security context to be updated on-the-fly to provide a more fine-grained view into the tenant's cloud resource use consumption. The approach also facilitates automatic escalation of security context, as the dynamic tag provides a mechanism by which additional logging and activity monitoring may be added to an existing security context. Any cloud service automation or other configuration or monitoring tools can query the encrypted tags (following their decryption).

Although the subject disclosure has illustrated the encrypted security context tags used to facilitate logging, this is not a limitation. Once the encrypted security context tags are generated, they may be used for any purpose in which a security context is pertinent.

The secure tag generation service comprises a set of services (or functions). These services may be integrated with one another in whole or in part. The services or functions typically are implemented in software, stored in computer memory as a set of computer program instructions, and executed by one or more processors as a specialized or dedicated machine. The functions described may be combined together, or one or more functions thereof may be distributed across multiple machines. Programs and databases that implement these functions may be co-located, or they may be located in different network or geographic locations.

An encrypted security context tag may be associated with other data, e.g., a simple customer number, a name, a hierarchical name, or some other identifier that can be used to identify a customer that is using a cloud service (perhaps with respect to a specific contract).

If there is ample security and/or the entities using the tag generation service are fully trusted, the encryption layer around the security context tag may be omitted.

In any of the above-described embodiments, any log data that has been enhanced to include the security context tag can be used to perform tenant-specific compliance analysis against the data, and to produce tenant-specific compliance reports.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, and as noted above, the cloud enabling aggregation proxy function is implemented in software, which includes but is not limited to firmware, resident software, microcode, and the like. The data (e.g., the annotated log data, audit records, and the like) can be configured into a data structure (e.g., an array, a linked list, etc.) and stored in a data store, such as computer memory. Furthermore, as noted above, the multi-tenant audit awareness functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the multi-tenant auditing components are implemented in a special purpose computer, preferably in software executed by one or more processors. The associated configuration is stored in an associated data store. The software also is maintained in one or more data stores or memories associated with the one or more processors, and the software may be implemented as one or more computer programs.

The multi-tenant auditing function may be implemented as an adjunct or extension to an existing audit service, logging service, or access manager solution. The technique also may be implemented in an automated compliance manager solution. One such automated solution is available commercially as Tivoli Compliance Insight Manager, available from IBM Corporation. This solution is a security compliance system, which operates on or across a network within or across an enterprise environment to collect, analyze and archive log data and to produce detailed security reports on information security policy compliance. A compliance manager system typically comprises a server, one or more actuators, a Web-based portal, and a management console. The server collects, archives, normalizes, and reports on log data from audited systems and devices. An actuator is a software component that maintains a secure connection between the server and one or more software agents running on each audited system. Actuator scripts enable the software agent to collect data (such as, without limitation, audit data) from supported platforms, which are also referred to as "event" sources. In operation, devices and systems are instrumented with the software agents. These devices and systems generate logs of user activities, processes, and event every time a person or system interacts with the network. These logs provide a record of all network activities and can be analyzed to show whether user behavior is in compliance with a given policy.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

There is no restriction on the particular syntax of the security context tag of this disclosure.

The term "context" as used herein should be broadly construed. As is well-known, in a computing environment as described generally above, the processing performed by deployed components typically depends upon the "context" of the invoking business process. "Context" here means a variety of things including: initiator's identity, initiator's authentication mechanism., initiator's location, business process flow, and the like. Thus, for example, the "context" for processing a message by a component includes any information about previously performed steps in the business process. From a security standpoint, this notion may be expanded to a "security context" which adds any security specific contextual information as web as security of generic context information. In an embodiment herein, and as explained above (e.g., in the discussion regarding the example scenario in FIG. 6), each of the various cloud resources that may be used by a cloud tenant typically has one or more attributes associated therewith, and each of the cloud resource attributes may have an associated user-specified or system-specified value. For a particular cloud tenant, the set of information defined by these values may then represent the "security context" for that particular tenant.

The invention claimed is:

1. A method of resource security and compliance monitoring in a multi-tenant cloud computing infrastructure, the cloud computing infrastructure comprising a set of network-accessible computing machines and software executed by one or more processors in the cloud computing infrastructure, comprising:

for a given tenant, deriving a security context from cloud resource meta-data and user-specific input data, the user-specific input data being security requirements for the given tenant in the cloud computing infrastructure;

encapsulating the cloud resource meta-data and the user-specific input data into a data structure;

processing the data structure into a data string that securely and uniquely represents the security context for the given tenant;

propagating the data string for the given tenant into machine-based logs generated by one or more cloud resource automation services that monitor the cloud computing infrastructure;

associating the data string to activities associated with one or more secure resources as the activities are monitored by the one or more cloud resource automation services to provide context-based visibility for the resource security and compliance monitoring in the cloud computing infrastructure by the one or more cloud resource automation services; and responsive to a request associated with the resource security and compliance monitoring, correlating information from the machine-based logs and that includes the data string to generate a security context-specific response, the security context-specific response associated with a tenant-specific compliance view;

wherein operations of the processing, the propagating and the correlating are carried out by the one or more processors.

2. The method as described in claim 1 wherein the data string is a security context tag that encodes the cloud resource meta-data and the user-specific input data.

3. The method as described in claim 2 wherein the data string is protected by a security wrapper generated by applying a given mathematical function to the security context tag.

4. The method as described in claim 3 further including removing the security wrapper prior to correlating the information.

5. The method as described in claim 1 further including updating the security context and the associated data string based on one of: a runtime behavior, and an event.

6. The method as described in claim 1 wherein the security context-specific response is a report detailing one of: user activity, resource usage, network monitoring, and workload execution.

7. The method as described in claim 6 wherein the report is specific to the given tenant and the security context for the given tenant.

* * * * *